(12) United States Patent
Choi et al.

(10) Patent No.: US 11,684,843 B2
(45) Date of Patent: Jun. 27, 2023

(54) PERSONAL MOBILITY DEVICE

(71) Applicant: NAVER LABS CORPORATION, Seongnam-si (KR)

(72) Inventors: Dong Il Choi, Seongnam-si (KR); Min Su Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 112 days.

(21) Appl. No.: 16/845,532

(22) Filed: Apr. 10, 2020

(65) Prior Publication Data

US 2020/0238159 A1 Jul. 30, 2020

Related U.S. Application Data

(63) Continuation of application No. PCT/KR2018/011921, filed on Oct. 11, 2018.

(30) Foreign Application Priority Data

Oct. 13, 2017 (KR) ........................ 10-2017-0133469

(51) Int. Cl.
*A63C 17/12* (2006.01)
*A63C 17/01* (2006.01)
*B62K 11/00* (2006.01)

(52) U.S. Cl.
CPC ............ *A63C 17/12* (2013.01); *A63C 17/012* (2013.01); *B62K 11/00* (2013.01); *A63C 17/015* (2013.01); *A63C 2203/12* (2013.01); *A63C 2203/18* (2013.01); *A63C 2203/24* (2013.01); *A63C 2203/46* (2013.01); *B62K 11/007* (2016.11)

(58) Field of Classification Search
CPC ... A63C 17/12; A63C 17/012; A63C 2203/18; B62K 11/00
See application file for complete search history.

(56) References Cited

U.S. PATENT DOCUMENTS

| | | | | |
|---|---|---|---|---|
| 3,522,953 A | * | 8/1970 | Louis ..................... | B62B 13/18 280/21.1 |
| 4,123,080 A | * | 10/1978 | Agajanian ............ | A63C 17/015 280/220 |
| 4,160,554 A | * | 7/1979 | Cooney ................. | A63C 17/01 280/87.042 |

(Continued)

FOREIGN PATENT DOCUMENTS

| | | |
|---|---|---|
| CN | 105879365 A | 8/2016 |
| JP | 10211313 A | 8/1998 |

(Continued)

OTHER PUBLICATIONS

Notice of allowance issued in KR 10-2017-0133469, dated Jul. 2, 2019.

(Continued)

*Primary Examiner* — Emma K Frick
(74) *Attorney, Agent, or Firm* — Greer Burns & Crain Ltd.

(57) ABSTRACT

A personal mobility device includes a frame connected to at least one wheel, a connection part on the frame, a boarding part connected to the connection part to be tiltable, a first sensor disposed on the frame to measure an inclination of the frame, and a second sensor disposed on the boarding part to measure an inclination of the boarding part.

11 Claims, 7 Drawing Sheets

(56) References Cited

U.S. PATENT DOCUMENTS

| | | | | |
|---|---|---|---|---|
| 4,230,330 A * | 10/1980 | Muhammad | ............ | A63C 17/01 280/87.042 |
| 5,839,737 A * | 11/1998 | Kruczek | ................ | A63C 17/01 280/258 |
| 6,419,248 B1 * | 7/2002 | Kay | ....................... | A63C 17/01 280/87.01 |
| 6,543,564 B1 * | 4/2003 | Kamen | .................. | A61G 5/125 180/89.13 |
| 6,789,806 B2 * | 9/2004 | Santa Cruz | .............. | A63C 5/03 280/14.21 |
| 7,174,976 B2 * | 2/2007 | Kamen | .................. | A63C 17/01 180/19.1 |
| 7,237,784 B1 * | 7/2007 | Monteleone | ........... | A63C 17/01 280/87.03 |
| 7,425,017 B2 * | 9/2008 | Mash | ..................... | A63C 5/075 280/14.22 |
| 7,717,200 B2 * | 5/2010 | Kakinuma | ............. | A63C 17/12 180/6.5 |
| 8,256,779 B1 * | 9/2012 | Johnson | ............... | A63C 17/015 280/87.042 |
| 8,322,477 B2 * | 12/2012 | Kamen | .................. | A61G 5/125 180/181 |
| 9,682,732 B2 * | 6/2017 | Strack | .................. | B62K 11/007 |
| 10,160,503 B1 * | 12/2018 | Zheng | .................. | A63C 17/013 |
| 10,265,606 B1 * | 4/2019 | Chung | .................. | A63C 17/012 |
| 10,437,213 B2 * | 10/2019 | Bhai | ..................... | G05B 19/042 |
| 10,538,286 B2 * | 1/2020 | Ying | ....................... | B62K 11/00 |
| 10,745,075 B2 * | 8/2020 | Kama | .................. | B62K 15/006 |
| 10,926,159 B1 * | 2/2021 | Smith | .................. | A63C 17/013 |
| 2005/0269794 A1 * | 12/2005 | Lukes | .................. | A63C 17/015 280/87.042 |
| 2010/0057319 A1 * | 3/2010 | Inaji | ..................... | B62K 11/007 701/70 |
| 2010/0152987 A1 * | 6/2010 | Gorai | ....................... | A61G 5/04 701/70 |
| 2012/0166048 A1 * | 6/2012 | Inoue | .................. | G05D 1/0238 701/49 |
| 2019/0250615 A1 * | 8/2019 | Gillett | .................. | G05D 1/0234 |
| 2020/0263982 A1 * | 8/2020 | Lee | ........................ | G01D 21/02 |

FOREIGN PATENT DOCUMENTS

| | | |
|---|---|---|
| JP | 2006001384 A | 1/2006 |
| JP | 2017169936 A | 9/2017 |
| KR | 1020170068184 A | 6/2017 |

OTHER PUBLICATIONS

Office action issued in KR 10-2017-0133469, dated Jan. 18, 2019.
ISR issued in Int'l. Application No. PCT/KR2018/011921 dated Feb. 1, 2019.

* cited by examiner

PERSONAL MOBILITY DEVICE

CROSS-REFERENCE TO RELATED APPLICATIONS

This is a continuation of International Application No. PCT/KR2018/011921, filed Oct. 11, 2018, which claims benefit of Korean Patent Application No. 10-2017-0133469, filed Oct. 13, 2017.

BACKGROUND OF THE INVENTION

Field of Invention

The present disclosure relates to a device, and more particularly, to a personal mobility device.

Description of Related Art

In recent years, the personal mobility device market has grown rapidly. When traveling relatively short distances, occupants use their own personal mobility device to move easily.

A personal mobility device may be understood to include an electric wheel, an electric kickboard, an electric skateboard, an electric bicycle, etc. and refers to a single-person moving means driven mainly by electric power. A personal mobility device does not emit harmful substances and has a small size, and thus has gained popularity as a means of transportation and as leisure goods.

Such a personal mobility device may be provided with various types of devices to change direction. For example, a personal mobility device may include a device for measuring contact with an occupant's body, the magnitude of a force applied by the occupant, and the like to change direction.

However, it will take a lot of time and effort to learn a variety of control methods of a personal mobility device of the related art.

BRIEF SUMMARY OF THE INVENTION

To address the above problem, the present disclosure is directed to providing a personal mobility device that is easy and convenient for an occupant to learn to handle. However, the above aspect is a merely example and thus the scope of the present disclosure is not limited thereto.

One aspect of the present disclosure provides a personal mobility device including a frame connected to at least one wheel, a connection part on the frame, a boarding part connected to the connection part to be tiltable, a first sensor disposed on the frame to measure an inclination of the frame, and a second sensor disposed on the boarding part to measure an inclination of the boarding part.

A personal mobility device according to embodiments of the present disclosure is easy for an occupant to learn how to operate and is simple to operate. In addition, the personal mobility device according to embodiments of the present disclosure is easy for an occupant to balance. The speed of the personal mobility according to embodiments of the present disclosure can be controlled accurately and be controlled even on a slope.

DETAILED DESCRIPTION OF THE INVENTION

Figure 1:
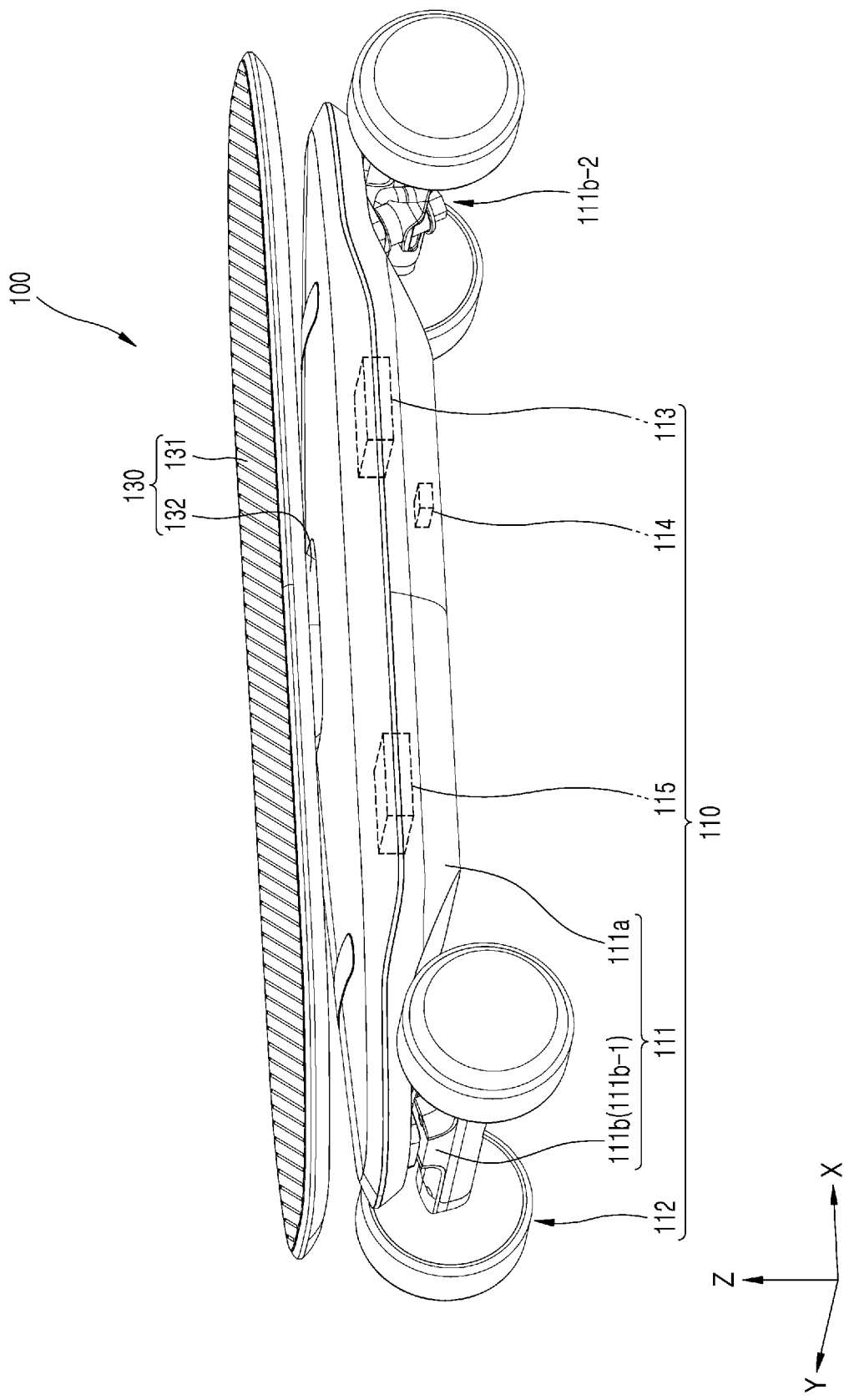
FIG. 1 is a perspective view of a personal mobility device according to an embodiment of the present disclosure.

One aspect of the present disclosure provides a personal mobility device including a frame connected to at least one wheel, a connection part on the frame, a boarding part connected to the connection part to be tiltable, a first sensor disposed on the frame to measure an inclination of the frame, and a second sensor disposed on the boarding part to measure an inclination of the boarding part.

The personal mobility device may further include a wheel driving part connected to the wheel and configured to rotate the wheel.

The wheel driving part may be driven, based on the difference between the inclination of the frame sensed by the first sensor and the inclination of the boarding part sensed by the second sensor.

The connection part may include a connection member configured to connect the boarding part and the frame to each other; and an elastic part disposed around the connection member and configured to provide an elastic force to the boarding part when the boarding part is tilted.

The elastic part may be arranged to surround an outer side of the connection member.

A plurality of connection parts may be provided and arranged to be spaced a certain distance from each other.

The frame may include a main frame, and a truck part which is coupled to the main frame to be rotatable and to which the wheel is connected to be rotatable.

The boarding part may include a boarding support configured to support an occupant located on the boarding part, and a connection housing provided on a lower side of the boarding support and connected to the connection part.

The connection housing may include a seating portion on which the second sensor is seated.

The seating portion may be recessed from a side of the connection housing in contact with the boarding support.

The connection housing may have a different cross-sectional area in a direction perpendicular to a height direction of the connection housing.

The wheel may include an in-wheel motor therein.

Another aspect of the present disclosure provides a personal mobility device including a frame connected to at least four wheels arranged to be spaced apart from each other, a connection part on the frame, and a boarding part connected to the connection part to be tiltable, wherein the connection part includes a connection member configured to connect the boarding part and the frame to each other, and an elastic part disposed around the connection member and configured to provide an elastic force to the boarding part when the boarding part is tilted.

The present disclosure will be apparent from embodiments described below in detail in conjunction with the accompanying drawings. However, the present disclosure is not limited to the embodiments set forth herein and may be embodied in many different forms. The embodiments are merely provided so that this disclosure will be thorough and complete and will fully convey the scope of the disclosure to those of ordinary skill in the art. The present disclosure should be defined by the scope of claims. The terminology used herein is for the purpose of describing embodiments only and is not intended to be limiting of the present disclosure. As used herein, singular forms are intended to include plural forms unless the context clearly indicates otherwise. As used herein, the terms "comprise" and/or "comprising" specify the presence of stated components, steps, operations and/or elements but do not preclude the presence or addition of one or more other components, steps, operations and/or elements. Terms such as first and second may be used to describe various components but the components should not be limited by the terms. The terms are only used to distinguish one component from another.

In the present specification, the term personal mobility device refers to a device on which one or more users ride. The personal mobility device may be driven mainly by electric power but is not limited thereto and may be driven by, for example, LPG, sunlight, gasoline, diesel, or the like.

Figure 2:
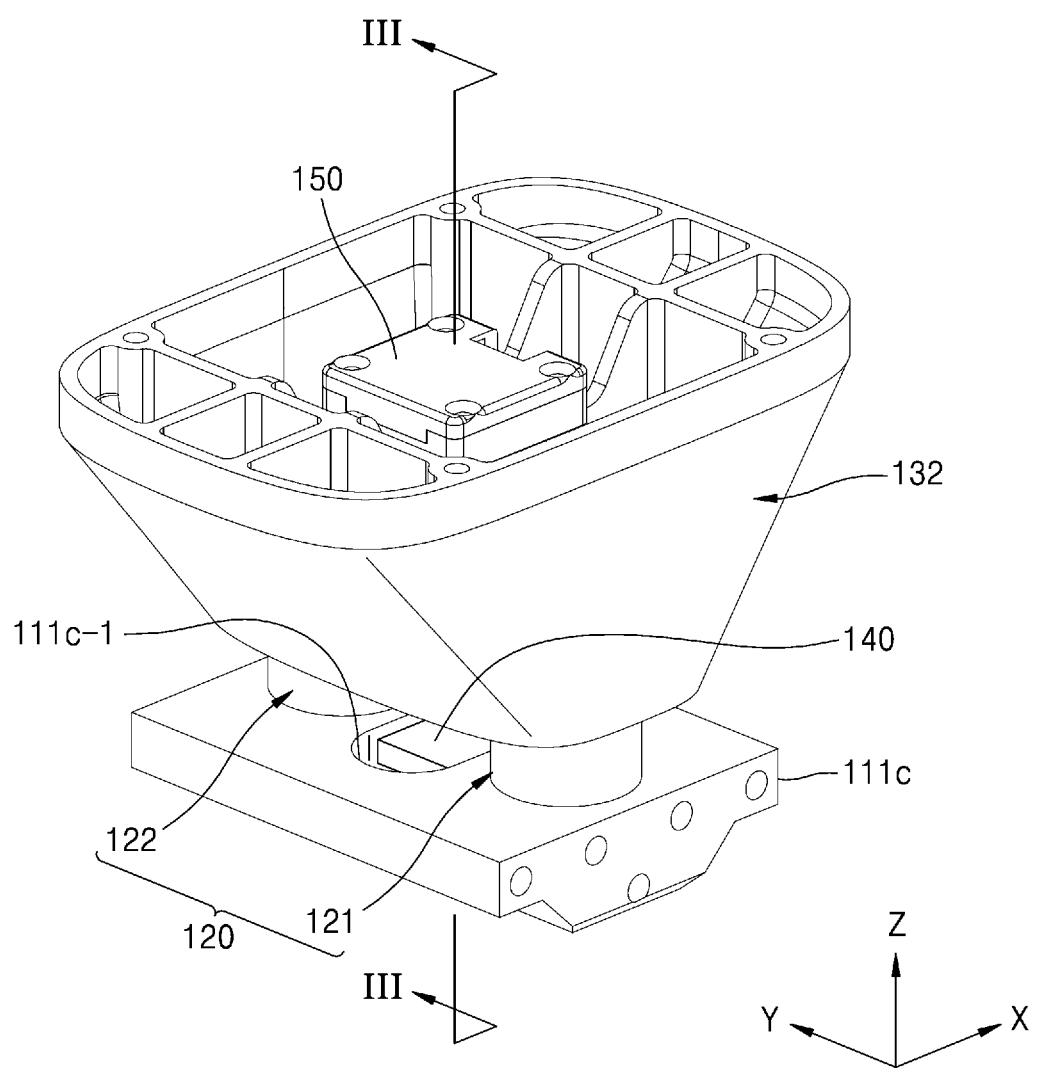
FIG. 2 is a perspective view of a connection part of the personal mobility device of FIG. 1.
Figure 3:
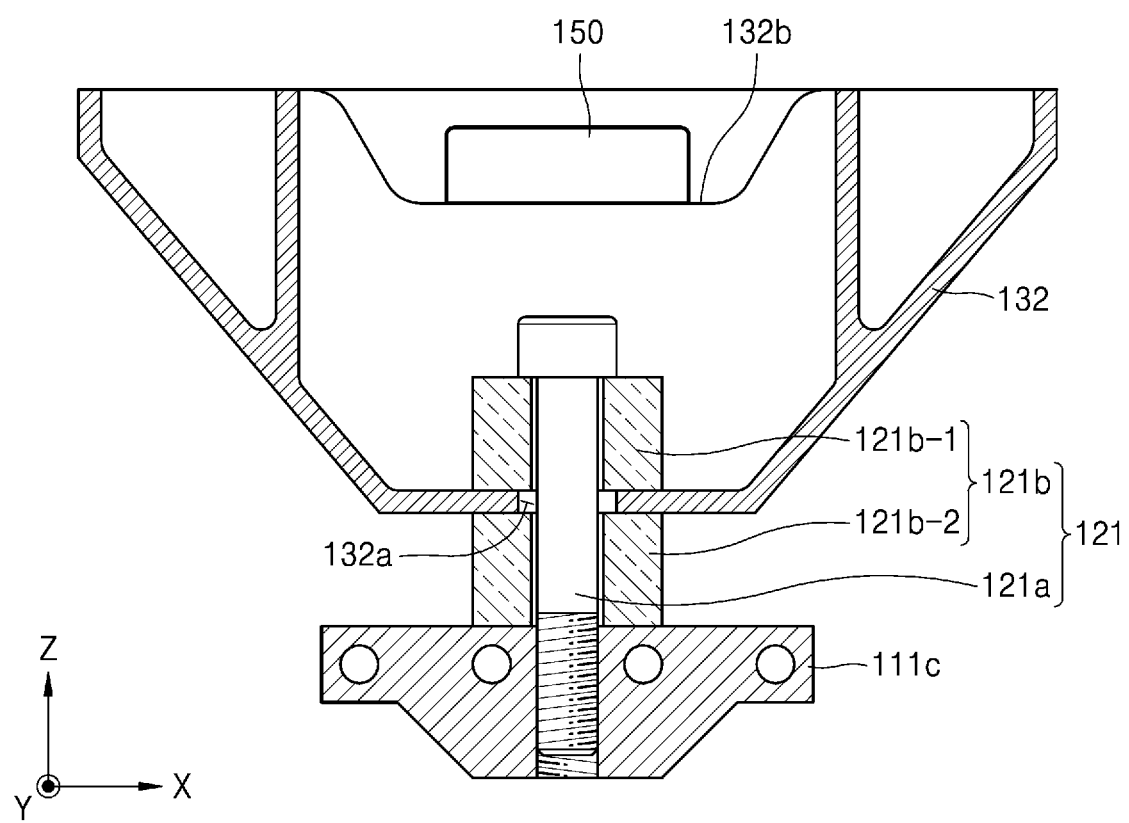
FIG. 3 is a cross-sectional view taken along line III-III of FIG. 2.
Figure 4:
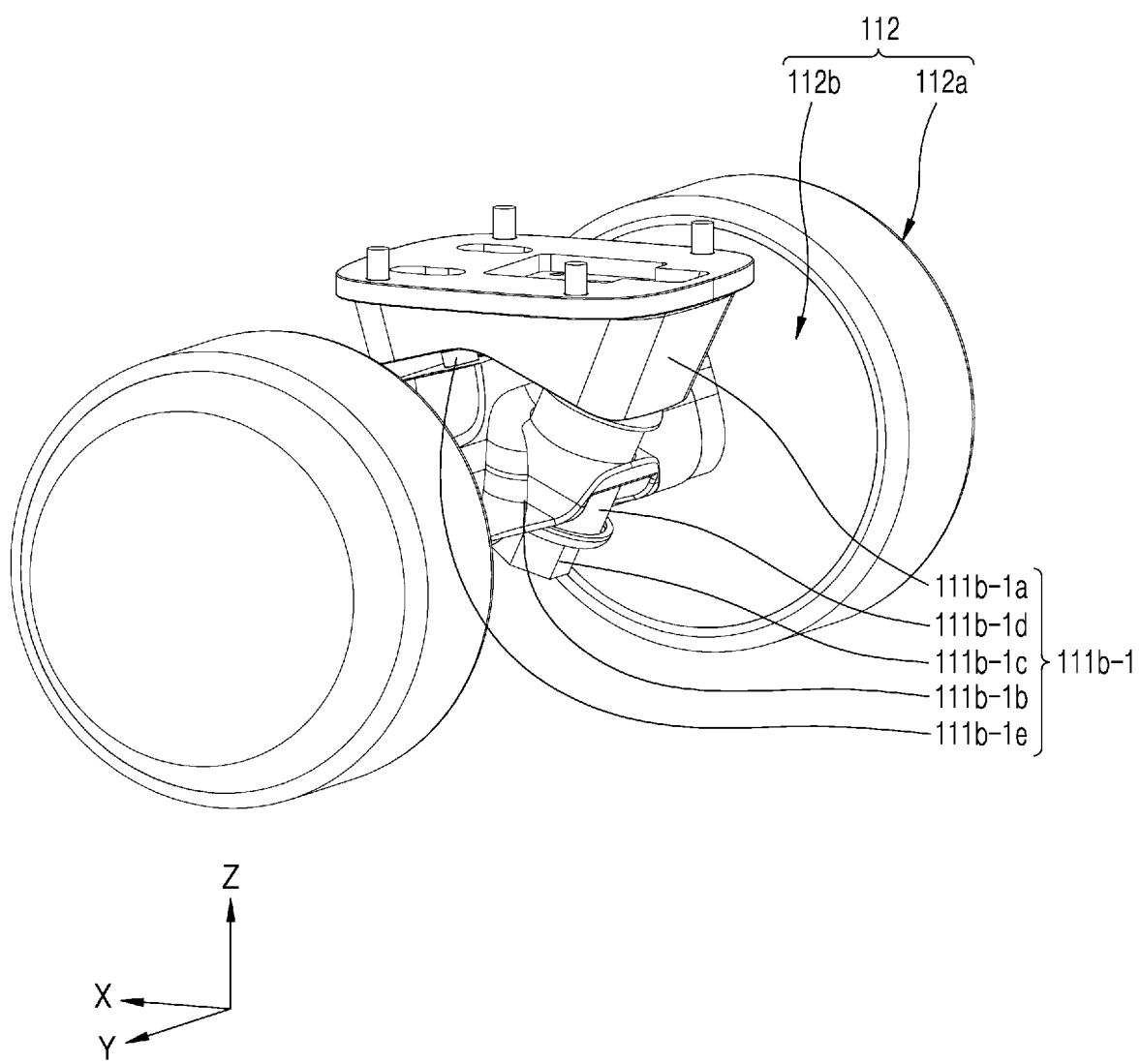
FIG. 4 is a perspective view of a truck part and a wheel illustrated in FIG. 1.

FIG. 1 is a perspective view of a personal mobility device according to an embodiment of the present disclosure. FIG. 2 is a perspective view illustrating a connection part of the personal mobility device of FIG. 1. FIG. 3 is a cross-sectional view taken along line III-III of FIG. 2. FIG. 4 is a perspective view illustrating a truck part and a wheel illustrated in FIG. 1.

Referring to FIGS. 1 to 4, a personal mobility device 100 may include a driving part 110, a connection part 120, a boarding part 130, a first sensor 140, and a second sensor 150.

The driving part 110 may be automatically driven when a signal is input thereto from an outside controller. In this case, the driving part 110 may include a frame 111 and at least one wheel 112 connected to the frame 111.

The frame 111 may include a main frame 111a, and a truck part 111b rotatably connected to the main frame 111a and connecting the main frame 111a and the wheel 112 to each other. The frame 111 may further include a fixed housing 111c connected to the connection part 120.

The main frame 111a may include a space formed therein. In this case, the main frame 111a may be manufactured by injecting synthetic resin or by assembling separate members together.

The truck part 111b may be provided on a bottom surface of the main frame 111a. In this case, the truck part 111b may be installed to support the main frame 111a and to be provided with at least one wheel 112 which is rotatable. In this case, the truck part 111b may include a first truck portion 111b-1 on a front side of the main frame 111a and a second truck portion 111b-2 on a rear side of the mainframe 111a. The first truck portion 111b-1 and the second truck portion 111b-2 are substantially the same and thus embodiments will be described below in detail with respect to the first truck portion 111b-1 for convenience of explanation. The first truck portion 111b-1 may include a first fixing bracket 111b-1a connected to the main frame 111a, and a first connection arm 111b-1b connected to the first fixing bracket 111b-1a so as to be movable relative to the first fixing bracket 111b-1a. In this case, the first truck portion 111b-1 may include a first king pin 111b-1c connecting the first fixing bracket 111b-1a and the first connection arm 111b-1b to each other, and a first bushing 111b-1d disposed between the first connection arm 111b-1b and the first fixing bracket 111b-1a and between the first king pin 111b-1c and the first connection arm 111b-1b. The first fixing bracket 111b-1a and the first connection arm 111b-1b may be connected to each other through a first pivot member 111b-1e provided separately from the first king pin 111b-1c, in addition to the above configuration.

The fixed housing 111c may be fixed by being coupled to the main frame 111a. In this case, at least a portion of the fixed housing 111c may be formed to be inclined. For example, an inclined side of the fixed housing 111c may face a direction of movement of the main frame 111a. In this case, the fixed housing 111c may partially offset a force applied to the fixed housing 111c when the main frame 111a is moved forward. The fixed housing 111c may be coupled to the main frame 111a in a direction perpendicular to the direction of movement of the main frame 111a. For example, the fixed housing 111c may be coupled to a side of the main frame 111a. In addition, a long hole 111c-1 may be formed inside the fixed housing 111c to allow a cable to pass therethrough.

At least one wheel 112 may be provided. In this case, a plurality of wheels 112 may be provided. The plurality of wheels 112 may be arranged spaced apart from each other and connected to the truck part 111b. In particular, the number of the plurality of wheels 112 may be four. For example, two wheels 112 may be connected to the first truck portion 111b-1 and the other two wheels 112 may be connected to the second truck portion 111b-2. For convenience of explanation, a case in which four wheels 112 are provided will be described in detail below.

The wheel 112 may have various forms. For example, in one embodiment, the wheel 112 may include a Mecanum wheel. In another embodiment, the wheel 112 may be formed similarly to a wheel and a tire of a general vehicle. For convenience of explanation, a case in which the wheel 112 is formed similarly to a wheel and a tire of a general vehicle will be described in detail below.

The wheel 112 may include a wheel body part 112a, and a wheel driving part 112b connected to the wheel body part 112a to rotate the wheel body part 112a. In one embodiment, the wheel driving part 112b may be provided in the wheel body part 112a. In this case, in one embodiment, the wheel driving part 112b may include an in-wheel motor provided inside the wheel body part 112a. In another embodiment, the wheel driving part 112b may include a belt connected to the wheel body part 112a and a motor connected to the belt to rotate the belt. In another embodiment, the wheel driving part 112b may include a motor and a power transmission link connected to the motor. In this case, the wheel driving part 112b is not limited thereto, and may include all devices and all structures connected to the wheel body part 112a to rotate the wheel body part 112a. However, for convenience of explanation, a case in which the wheel driving part 112b includes an in-wheel motor will be described in detail below. In this case, the wheel driving part 112b may be connected to an external cable, wire, and the like. In this case, the external cable, the wire, and the like may be inserted into the first connection arm 111b-1b or be shielded by a separate cover coupled to the first connection arm 111b-1b. In particular, when the external cable, the wire, and the like are shielded by the separate cover, the first connection arm 111*b*-1*b* may be provided with grooves in which the external cable, the wire, and the like are placed.

In addition to the above components, the driving part 110 may include a power supply 113 electrically connected to the wheel driving part 112*b*, a communication module 114 for wireless communication with the outside controller, and a controller 115 connected to the wheel driving part 112*b* for control of the operation of the wheel driving part 112*b*. In this case, the power supply 113 may include a rechargeable secondary battery. The communication module 114 may establish various types of wireless communication such as Wi-Fi, Bluetooth, and the like. The controller 115 may control the wheel driving part 112*b* or transmit processed information to the outside through the communication module 114, based on a signal transmitted from the communication module 114.

The connection part 120 may connect the driving part 110 and the boarding part 130 to each other. In this case, the connection part 120 may connect the boarding part 130 to the driving part 110 such that the boarding part 130 is tiltable relative to the driving part 110. One connection part 120 as described above may be provided to connect the driving part 110 and the boarding part 130 to each other. In another embodiment, a plurality of connection parts 120 may be provided. The plurality of connection parts 120 may be arranged spaced apart from each other to connect the boarding part 130 and the driving part 110 to each other. In this case, the plurality of connection parts 120 may be arranged spaced apart from each other to prevent excessive force from being applied to one connection part 120. For convenience of explanation, a case in which a plurality of connection parts 120 are provided will be described in detail below.

The plurality of connection parts 120 may include a first connection part 121 and a second connection part 122 disposed to be spaced apart from the first connection part 121. In this case, the first connection part 121 and the second connection part 122 may be arranged to be symmetrical with respect to the center of the fixed housing 111*c*. The first connection part 121 and the second connection part 122 are formed to be the same or substantially the same and thus embodiments will be described in detail below with respect to the first connection part 121 for convenience of explanation.

The first connection part 121 may include a first connection member 121*a* connecting the driving part 110 and the boarding part 130 to each other. In addition, the first connection part 121 may include a first elastic part 121*b* around the first connection member 121*a*.

The first connection member 121*a* may pass through the boarding part 130 and then be inserted into the fixed housing 111*c*. In particular, the first connection member 121*a* may be in the form of a bolt or pin. In this case, a first insertion hole 132*a* may be formed in a portion of the boarding part 130 to which the first connection member 121*a* is coupled. In this case, the first insertion hole 132*a* may be in the form of a long hole provided along a lengthwise direction of the boarding part 130. In addition, an inner side of the first insertion hole 132*a* may be separated from the first connection member 121*a*. In this case, a cross-sectional area of the first connection member 121*a* perpendicular to the lengthwise direction may be smaller than an area of the first insertion hole 132*a*.

The first elastic part 121*b* may be provided around the first connection member 121*a*. For example, in one embodiment, the first elastic part 121*b* may be disposed to be spaced apart from the first connection member 121*a*. In this case, the first elastic part 121*b* may be provided between the boarding part 130 and the fixed housing 111*c* to provide an elastic force to the boarding part 130 when the boarding part 130 is tilted. In another embodiment, the first elastic part 121*b* may be provided to surround the first connection member 121*a*. In this case, the first connection member 121*a* may be inserted into the first elastic part 121*b*. For convenience of explanation, a case in which the first elastic part 121*b* is provided to surround an outer side of the first connection member 121*a* will be described in detail below.

The first elastic part 121*b* may be formed in various forms. For example, the first elastic part 121*b* may include coil spring. In another embodiment, the first elastic part 121*b* may be in the form of a bar formed of an elastic material such as rubber, silicone, urethane, or the like. For convenience of explanation, a case in which the first elastic part 121*b* is in the form of a bar formed of a urethane material will be described in detail below.

The first elastic part 121*b* may include a first upper elastic part 121*b*-1 between one end of the first connection member 121*a* and the boarding part 130, and a first lower elastic part 121*b*-2 between the boarding part 130 and the fixed housing 111*c*. In this case, a portion of at least one of the first upper elastic part 121*b*-1 or the first lower elastic part 121*b*-2 may be inserted into the first insertion hole 132*a*. In another embodiment, the first elastic part 121*b* may include the first upper elastic part 121*b*-1 and the first lower elastic part 121*b*-2, and a first insertion portion (not shown) inserted into the first insertion hole 132*a*. In this case, the first insertion portion may be formed of a material the same as or different from those of the first upper elastic part 121*b*-1 and the first lower elastic part 121*b*-2. For convenience of explanation, a case in which the first elastic part 121*b* includes the first upper elastic part 121*b*-1 and the first lower elastic part 121*b*-2 will be described in detail below.

The boarding part 130 may be connected to the driving part 110 through the connection part 120. The boarding part 130 may include a boarding support 131 and a connection housing 132.

The boarding support 131 may be formed in a plate shape and provided with irregularities on an upper side thereof to prevent an occupant from slipping. In addition, the boarding support 131 may be formed of a material deformable to a certain degree to absorb some impacts.

The connection housing 132 may be coupled to the boarding support 131. In this case, the connection housing 132 may be formed to protrude toward the connection part 120 from a lower side of the boarding support 131. The connection housing 132 may have a different cross-sectional area perpendicular to a height direction of the connection housing 132. For example, a cross-sectional area of the connection housing 132 may be increased from the connection part 120 in the height direction of the connection housing 132 toward the boarding support 131. In this case, the connection housing 132 is capable of concentrating load applied to the boarding support 131 and transmitting the concentrated load to the connection part 120 while effectively supporting the load. The first insertion hole 132*a* and a second insertion hole (not shown) may be formed in a lower side of the connection housing 132. In this case, the first insertion hole 132*a* and the second insertion hole may be in the form of a long hole as described above. In addition, the connection housing 132 may include a seating portion 132*b* on which the second sensor 150 is seated. In this case, the seating portion 132*b* may be formed recessed from a side of the connection housing 132 toward the inside of the connection housing 132. For example, the seating portion 132b may be formed recessed from a surface of the connection housing 132, which is in contact with the boarding support 131, toward the connection part 120. In this case, the second sensor 150 may be separated from the boarding support 131 and thus may not be affected by vibration or shock applied to the boarding support 131. Therefore, the sensing performance of the second sensor 150 may improve and thus sensing may be performed accurately.

The first sensor 140 is capable of measuring an angle (or an inclination) of the driving part 110. In this case, the first sensor 140 may be in various forms, such as a gyro sensor, an inclination sensor, and an angle sensor. The angle of the driving part 110 measured by the first sensor 140 may be an angle at which the driving part 110 is tilted with respect to a flat surface of the ground (or a plane parallel to a surface of the sea). The first sensor 140 may be disposed on various locations on the driving part 110. For example, the first sensor 140 may be disposed in the main frame 111a. In another embodiment, the first sensor 140 may be disposed in the fixed housing 111c. In particular, when the first sensor 140 is disposed in the fixed housing 111c, the first sensor 140 may be inserted into the long hole 111c-1. In another embodiment, the first sensor 140 may be disposed outside the main frame 111a. For convenience of explanation, a case in which the first sensor 140 is disposed in the long hole 111c-1 will be described in detail below.

The second sensor 150 may be disposed in the boarding part 130 to sense an angle (or inclination) of the boarding part 130. In this case, the angle of the boarding part 130 measured by the second sensor 150 may be an angle at which the boarding part 130 is tilted with respect to a flat surface of the ground (or a plane parallel to the surface of the sea). The second sensor 150 may be disposed on various locations on the boarding part 130. For example, in one embodiment, the second sensor 150 may be disposed inside or outside the boarding support 131. In another embodiment, the second sensor 150 may be disposed inside the connection housing 132 as described above. For convenience of explanation, a case in which the second sensor 150 is provided in the connection housing 132 will be described in detail below.

An operation method of the personal mobility device 100 will be described in detail below.

Figure 5:
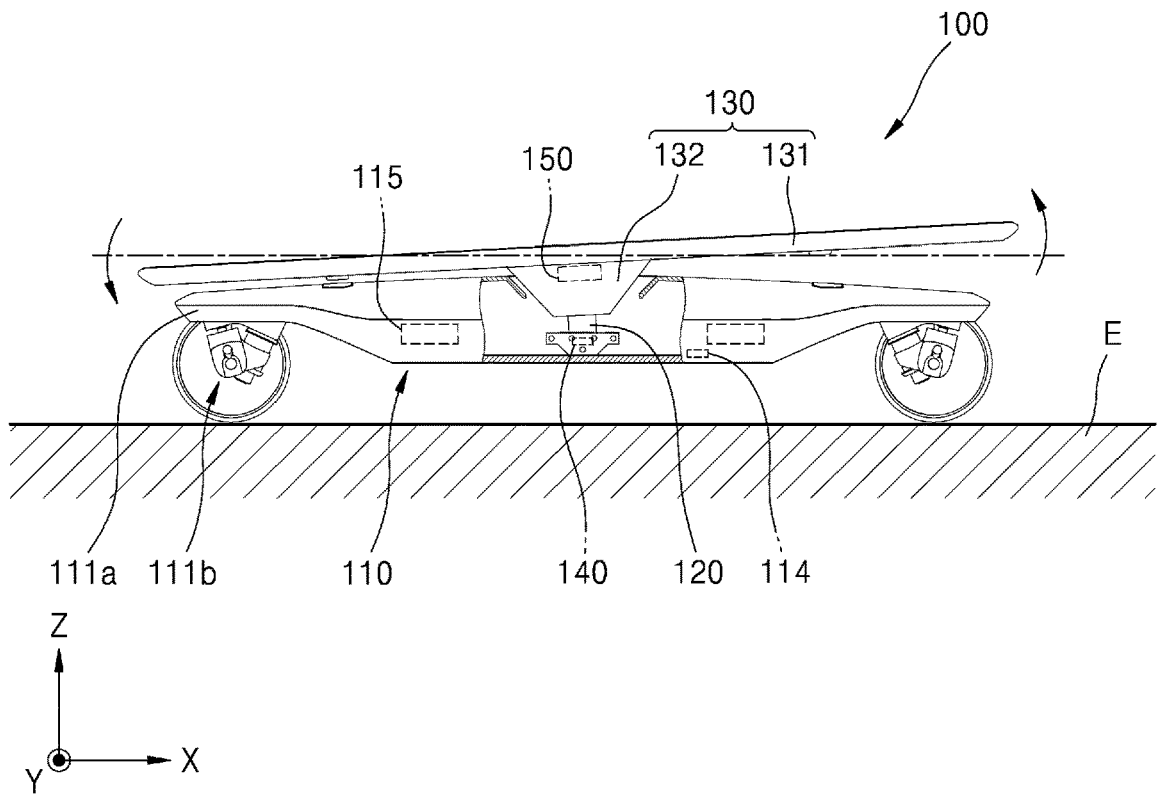
FIG. 5 is a side elevational view of the personal mobility device of FIG. 1 with sections removed to show a connection housing provided within a main frame and to illustrate an operation method of the personal mobility device of FIG. 1.
Figure 6:
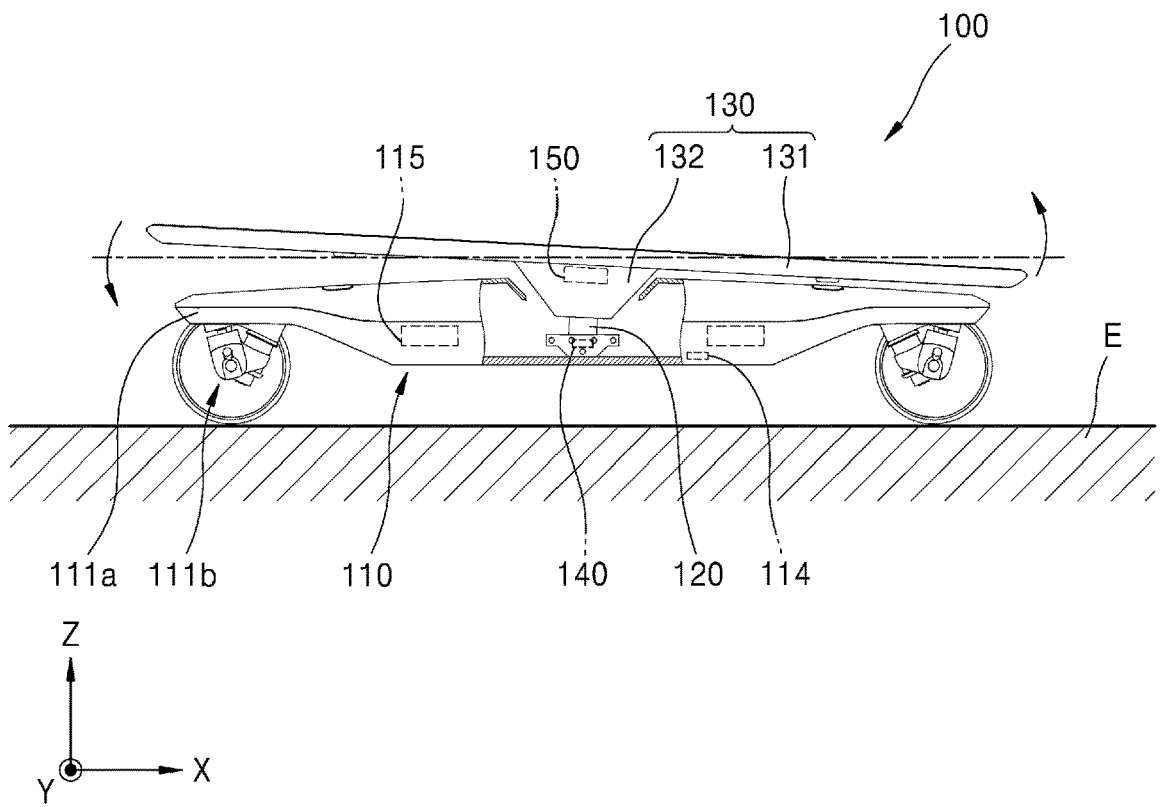
FIG. 6 is a side elevational view of the personal mobility device of FIG. 5, further illustrating an operation method of the person mobility device of FIG. 1.

FIGS. 5 and 6 are side elevational views of the personal mobility device of FIG. 1 with sections removed to show the connection housing 132 being provided within the main frame 111a.

Referring to FIGS. 5 and 6, the personal mobility device 100 may be moved forward (e.g., in an −X-axis direction in FIG. 5), stopped or moved backward (e.g., in an +X-axis direction in FIG. 5). In detail, an occupant may ride on the boarding part 130 and operate the personal mobility device 100 to be driven in response to a signal input from the outside. In this case, the occupant may operate the personal mobility device 100 in various ways. For example, the occupant may operate the personal mobility device 100 through a switch provided in the personal mobility device 100. In another embodiment, an operation signal for the personal mobility device 100 may be input through a portable terminal (not shown) such as an external remote controller or mobile phone. In another embodiment, the personal mobility device 100 may operate when an occupant makes a certain motion. In this case, examples of the motion may include a certain tilting motion made by the boarding part 130. In another embodiment, the personal mobility device 100 may include a load sensor (not shown) and operate when weight sensed by the load sensor is greater than or equal to a predetermined value. In this case, an operation method of the personal mobility device 100 is not limited thereto, and may include various devices and methods capable of inputting a signal for starting driving of the personal mobility device 100. For convenience of explanation, a method of operating the personal mobility device 100 by starting driving of the personal mobility device 100 using a remote controller, the method being performed by an occupant, will be described in detail below.

As described above, the occupant may start driving of the personal mobility device 100 through a remote controller after standing on the personal mobility device 100. When the personal mobility device 100 operates, the occupant may tilt the boarding support 131. For example, the occupant may apply a force to the front surface of the boarding support 131 such that the front surface of the boarding support 131 is moved downward and the rear surface of the boarding support 131 is moved upward. In this case, when the boarding support 131 is moved as described above, the connection housing 132 may also be tilted as described above, together with the boarding support 131. The seating portion 132b (shown in FIG. 3) is moved in the same direction together with the connection housing 132 and thus the second sensor 150 may make a motion. In this case, the second sensor 150 may measure an angle (or inclination) at which the boarding support 131 is tilted with respect to the ground E. For example, the second sensor 150 may include a gyro sensor or an inertial measurement unit (IMU). In this case, the ground E may be a flat surface and refer to a plane perpendicular to a weight direction. The angle measured as described above may be transmitted to the controller 115.

As described above, while at least one of an angle of tilt of the boarding support 131 or angular velocity of the boarding support 131 is sensed by the second sensor 150, the first sensor 140 may measure an angle of tilt of the driving part 110 and transmit a result of measuring to the controller 115. In this case, a method of measuring an angle by the first sensor 140 may be the same as or similar to that of measuring an angle by the second sensor 50.

The controller 115 may calculate an actual angle at which the boarding support 131 is tilted with respect to the ground E, based on results measured by the first sensor 140 and the second sensor 150. In addition, the controller 115 may calculate actual angular velocity of the boarding support 131, based on a change in the actual angle.

When the calculation of the actual angle and the actual angular velocity is completed, the controller 115 may control each wheel driving part (not shown), based on the actual angle and the actual angular velocity. For example, when an initial current speed of the personal mobility device 100 is 0 (for example, when the personal mobility device 100 is stopped), the controller 115 may calculate a target speed for controlling the actual angle to 0 degrees according to the actual angle and actual angular velocity of the boarding part 131, and the target speed may be continuously updated based on the current speed, the actual angle, and the actual angular velocity of the personal mobility device 100 updated according to the calculated target speed, thereby moving the personal mobility device 100. That is, the controller 115 may increase the speed of the personal mobility device 100 as the actual angle becomes increased. In addition, the controller 115 may maintain the speed of the personal mobility device 100 constant when the actual angle has a certain value and the actual angular velocity is zero.

The speed of the personal mobility device 100 may be also reduced in cases other than the above cases. Specifically, the controller 115 may reduce the speed of the personal mobility device 100, when an occupant tilts the boarding support 131 in an opposite way to the above such that the actual angle is reduced, when the actual angular velocity is changed to an opposite value (for example, from a negative value to a positive value or from a positive value to a negative value), or when the actual angle is changed to an opposite value (for example, from a positive value to a negative value or from a negative value to a positive value).

In addition, the personal mobility device 100 may be moved in one direction and then stopped. Specifically, when the occupant changes an angle of the boarding support 131 to be the same as that of the driving part 110 during the movement of the personal mobility device 100 as described above, an angle sensed by the first sensor 140 and an angle sensed by the second sensor 150 may be the same. In this case, the controller 115 may stop the driving part 110 by stopping the operation of the wheel driving part 112b. In another embodiment, when the occupant tilts the boarding support 131 in the opposite method as described above, the controller 115 may stop the driving part 110 by controlling the operation of the wheel driving unit 112b in a method opposite to that described above. In this case, the personal mobility device 100 may be stopped when the angle of the boarding support 131 is completely coincident with that of the driving part 110.

When the boarding support 131 is tilted as described above, the connection part 120 may provide an elastic force to the boarding support 131. In this case, operations of a first connection part 121 (shown in FIGS. 2 and 3) and a second connection part 122 (shown in FIG. 2) are the same or similar to each other and thus the operation of the first connection part 121 will be described in detail below for convenience of explanation. In detail, the first connection part 121 may connect the driving part 110 and the boarding part 130 to each other. In this case, the first upper elastic part 121b-1 (shown in FIG. 3) may be restrained by being disposed between the first connection member 121a and the connection housing 132. In addition, the first upper elastic part 121b-1 may provide an elastic force to the connection housing 132 when the connection housing 132 is moved during tilting of the boarding support 131. The first lower elastic part 121b-2 may be disposed between the connection housing 132 and the fixed housing 111c. to provide an elastic force to the connection housing 132. In this case, the first upper elastic part 121b-1 and the first lower elastic part 121b-2 may provide an elastic force to different portions of the connection housing 132. For example, a portion of the connection housing 132 to which the elastic force is applied by the first upper elastic part 121b-1 and another portion of the connection housing 132 to which the elastic force is applied by the first lower elastic part 121b-2 may be symmetrical with each other about the first connection member 121a. Accordingly, the first upper elastic part 121b-1 and the first lower elastic part 121b-2 may not only disperse a force applied by the connection housing 132 but also provide elastic forces to the connection housing 132 and thus the boarding part 130 may be quickly returned to its original state when the boarding part 130 is tilted.

The personal mobility device 100 may also be moved backward in an opposite direction to the forward direction described above. In this case, a method of moving the personal mobility device 100 backward is opposite to that described above and thus a detailed description thereof will be omitted here.

The direction of the personal mobility device 100 may be changed. Specifically, the direction of the personal mobility device 100 may be changed when an occupant applies a load to a side of the personal mobility device 100. When the occupant concentrates a load on a side of the personal mobility device 100, the main frame 111a and the boarding part 130 may be tilted with respect to the truck part 111b. In this case, the direction of the personal mobility device 100 may be changed to a direction in which the main frame 111a and the boarding part 130 are tilted. When the personal mobility device 100 turns in an opposite direction, the occupant may concentrate the load in a method opposite to that described above to change the direction of the personal mobility device 100 in the opposite direction. In this case, the occupant may apply a force to both one of the front surface and rear surface, and one of the side surfaces of the boarding part 130 to change the direction of the personal mobility device 100 while moving the personal mobility device 100 forward or backward.

Therefore, the personal mobility device 100 has a simple structure for a forward or backward movement, and thus, an occupant may learn how to use the personal mobility device 100 easily and quickly. The personal mobility device 100 may secure structural safety by connecting the boarding part 130 and the driving part 110 to be tiltable through the connection part 120. In addition, the personal mobility device 100 does not require a separate control device and may be controlled intuitively by the occupant.

In particular, the personal mobility device 100 may be provided with four wheels 122 to improve driving stability. Furthermore, the personal mobility device 100 may be moved at high speeds and the speed thereof may be controlled quickly and accurately.

Meanwhile, the personal mobility device 100 may transmit various information such as a driving distance, a driving speed, and a remaining distance to an external terminal through the communication module 114 during driving as described above.

Figure 7:
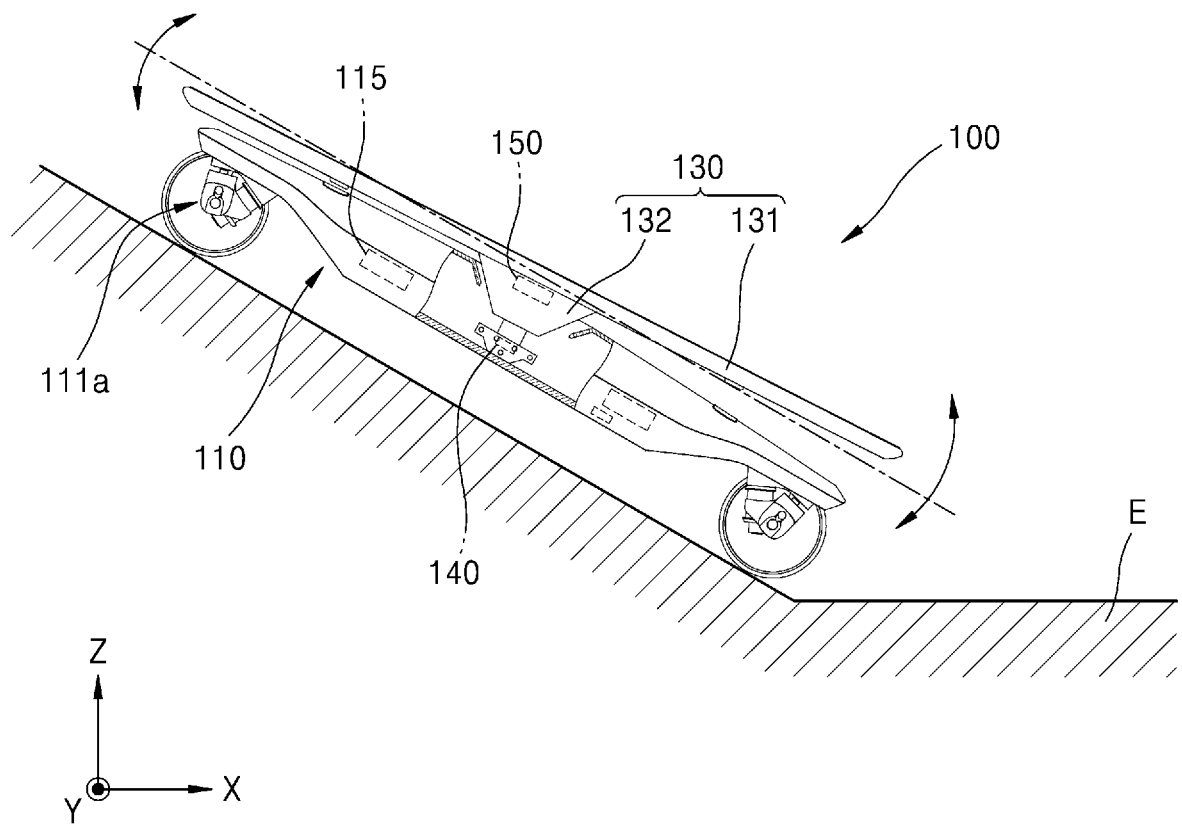
FIG. 7 is a side elevational view of the personal mobility device of FIG. 5, illustrating a state in which the personal mobility device of FIG. 1 is disposed on a slope.
Figure 8:
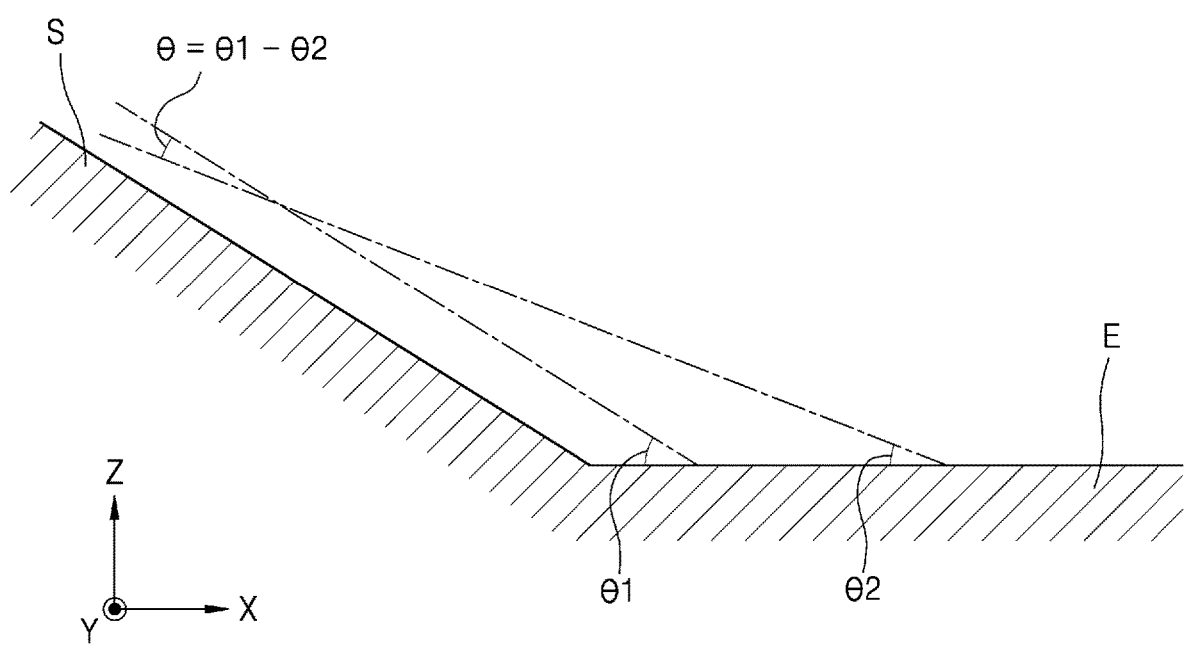
FIG. 8 is a diagram illustrating a relationship between angles sensed by a first sensor and a second sensor of the personal mobility device of FIG. 7 and the ground.

FIG. 7 is a front view illustrating a state in which the personal mobility device of FIG. 1 is disposed on a slope. FIG. 8 is a diagram illustrating a relationship between angles sensed by the first sensor 140 and the second sensor 150 of the personal mobility device 100 of FIG. 7 and the ground.

Referring to FIGS. 7 and 8, the personal mobility device 100 may move upward or downward along an inclined plane S. In this case, the speed of the personal mobility device 100 may be calculated to be abnormal due to a skewed result sensed by the second sensor 150. To prevent this problem, as described above, the controller 115 may calculate an actual angle θ of the boarding part 130, based on results measured by the first sensor 140 and the second sensor 150.

Specifically, as illustrated in FIG. 7, when the personal mobility device 100 is disposed and driven on the inclined plane S, the second sensor 150 may calculate a second angle θ2 at which the boarding part 130 is tilted with respect to the ground E instead of sensing an actual angle θ at which the boarding part 130 is tilted with respect to the inclined plane S. In addition, the first sensor 140 may calculate a first angle θ1 at which the driving part 110 is tilted with respect to the ground E instead of sensing an angle at which the driving part 110 is tilted with respect to the inclined plane S. In this case, the controller 115 may calculate an actual angle θ that is the difference between the first angle θ1 and the second angle θ2, based on the first angle θ1 and the second angle θ2. The controller 115 may calculate actual angular velocity, based on the calculated actual angle θ, and control the personal mobility device 100 according to the actual angular velocity. In this case, driving of the personal mobility device 100 is controlled in a method the same as or similar to that described above and thus a detailed description thereof will be omitted.

Therefore, the personal mobility device 100 may be prevented from malfunctioning or operating abnormally even on the inclined plane S. In particular, the personal mobility device 100 is capable of being driven even on the inclined plane S in a method the same as or similar to that on the ground E.

Although the present disclosure has been described above in connection with the above-mentioned embodiments, various modifications or changes may be made therein without departing from the spirit and scope of the present disclosure. Accordingly, the scope of the appended claims should be understood to cover such modifications or changes as long as they fall within the spirit of the present disclosure.

One embodiment of the present disclosure provides a personal mobility device with increased driving stability, and embodiments of the present disclosure are applicable to skateboards, electric kickboards, and the like used in leisure and the like.

The invention claimed is:

1. A personal mobility device movable on a surface, comprising:
   a main frame;
   at least one truck part coupled to and tiltable relative to the main frame;
   at least one rotatable wheel connected to the at least one truck part;
   at least one connection part connected to the main frame;
   a tiltable boarding part connected to the at least one connection part and configured to enable a user to stand on the boarding part;
   a first sensor provided on the main frame, the first sensor being configured to measure an inclination of the main frame relative to a horizontal plane;
   a second sensor provided on the boarding part, the second sensor being configured to measure an inclination of the boarding part relative to the horizontal plane; and
   a controller for calculating a difference between the inclination of the main frame and the inclination of the boarding part and determining an angular velocity of the personal mobility device based on the calculated difference in the inclinations.

2. The personal mobility device of claim 1, further comprising a wheel driving part connected to the at least one wheel and configured to rotate the at least one wheel.

3. The personal mobility device of claim 1, wherein the at least one connection part comprises:
   a connection member configured to connect the boarding part and the frame to each other; and
   an elastic part disposed around the connection member, and configured to provide an elastic force to the boarding part when the boarding part is tilted.

4. The personal mobility device of claim 3, wherein the elastic part is arranged to surround an outer side of the connection member.

5. The personal mobility device of claim 1, wherein the at least one connection part includes two connection parts provided and arranged to be spaced at a predetermined distance from each other.

6. The personal mobility device of claim 1, wherein the boarding part comprises:
   a boarding support configured to support the user; and
   a connection housing provided on a lower side of the boarding support and connected to the at least one connection part.

7. The personal mobility device of claim 6, wherein the connection housing comprises a seating portion on which the second sensor is seated.

8. The personal mobility device of claim 7, wherein the seating portion is recessed from a side of the connection housing in contact with the boarding support.

9. The personal mobility device of claim 6, wherein the connection housing has a wider cross-sectional area at an end provided on the lower side of the boarding support than at an end connected to the at least one connection part.

10. The personal mobility device of claim 1, wherein the at least one wheel comprises an in-wheel motor provided therein.

11. The personal mobility device of claim 1, wherein the boarding part is tiltable in at least four directions relative to the frame.

* * * * *